(12) United States Patent
Maeda et al.

(10) Patent No.: US 12,490,948 B2
(45) Date of Patent: Dec. 9, 2025

(54) X-RAY PHASE IMAGING APPARATUS AND DISPLAY METHOD OF PREVIEW IMAGE IN X-RAY PHASE IMAGING APPARATUS

(71) Applicant: Shimadzu Corporation, Kyoto (JP)

(72) Inventors: Yuto Maeda, Kyoto (JP); Kana Kojima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 226 days.

(21) Appl. No.: 18/357,287

(22) Filed: Jul. 24, 2023

(65) Prior Publication Data

US 2024/0099682 A1 Mar. 28, 2024

(30) Foreign Application Priority Data

Sep. 27, 2022 (JP) .................. 2022-153803

(51) Int. Cl.
*A61B 6/00* (2024.01)
*A61B 6/40* (2024.01)
*A61B 6/42* (2024.01)
*A61B 6/46* (2024.01)

(52) U.S. Cl.
CPC ............ *A61B 6/484* (2013.01); *A61B 6/4035* (2013.01); *A61B 6/4291* (2013.01); *A61B 6/463* (2013.01)

(58) Field of Classification Search
CPC ................................ A61B 6/484; A61B 6/463
See application file for complete search history.

(56) References Cited

U.S. PATENT DOCUMENTS

| | | | |
|---|---|---|---|
| 9,855,018 B2 | 1/2018 | Hamano et al. | |
| 2014/0177789 A1* | 6/2014 | Baturin | A61B 6/484 378/35 |
| 2016/0310099 A1* | 10/2016 | Hamano | A61B 6/563 |
| 2018/0153486 A1* | 6/2018 | Martens | A61B 6/4042 |
| 2022/0160432 A1* | 5/2022 | Auvray | A61B 6/12 |

FOREIGN PATENT DOCUMENTS

JP 6260615 B2 1/2018

* cited by examiner

*Primary Examiner* — Chih-Cheng Kao
(74) *Attorney, Agent, or Firm* — Maier & Maier, PLLC

(57) ABSTRACT

An X-ray phase imaging apparatus includes an X-ray source; a detector; a plurality of gratings; an image processor configured to generate two or more types of first phase contrast images selected from absorption, differential phase and dark-field images as preview images under an imaging condition simpler than an imaging condition for a second phase contrast image to be captured in actual imaging; and a controller configured to display the first phase contrast images on a display.

8 Claims, 6 Drawing Sheets

TRANSLATION DIRECTION OF
GRATING IN HORIZONTAL ORIENTATION

▨ SELF-IMAGE OF FIRST GRATING
▭ SECOND GRATING (X-RAY ABSORBER)

GENERATION AND DISPLAY PROCESSING OF FIRST PHASE CONTRAST IMAGES, AND GENERATION PROCESSING OF SECOND PHASE CONTRAST IMAGE OR CT IMAGE

MODIFIED EMBODIMENT (A) GRATINGS ORIENTATED IN HORIZONTAL ORIENTATION (B) GRATINGS ORIENTATED IN VERTICAL ORIENTATION

X-RAY PHASE IMAGING APPARATUS AND DISPLAY METHOD OF PREVIEW IMAGE IN X-RAY PHASE IMAGING APPARATUS

CROSS-REFERENCE TO RELATED APPLICATIONS

The related application number JP2022-153803, X-ray phase imaging apparatus and display method of preview image in X-ray phase imaging apparatus, Sep. 27, 2022, Yuto Maeda, Kana Kojima upon which this patent application is based is hereby incorporated by reference.

FIELD

The present invention relates to an X-ray phase imaging apparatus and a display method of a preview image in an X-ray phase imaging apparatus.

BACKGROUND

Conventionally, an X-ray phase imaging apparatus including an X-ray source, a detector, a plurality of gratings and an image processor is known. Such an apparatus is disclosed in Japanese Patent Publication No. JP6260615, for example.

The above Japanese Patent Publication No. JP6260615 discloses a Talbot imaging apparatus (X-ray phase imaging apparatus) including an X-ray source, a detector, a plurality of gratings and a controller (image processor). Also, the above Japanese Patent Publication No. JP6260615 discloses that the controller is configured to generate absorption, differential phase and dark-field images. Also, the above Japanese Patent Publication No. JP6260615 discloses that in order to check a position of a subject on a subject holder of the Talbot imaging apparatus prior to actual imaging in which an image of the subject is actually captured, preliminary imaging is performed in which an image of the subject is preliminarily captured while the subject is fixed on the subject holder and irradiated with with a low dose of X-rays. Also, the Publication discloses that the controller is configured to preliminarily capture a plurality of X-ray images while variously changing conditions of a targeted part of the subject and to generate images such as reconstructed images based on the preliminarily captured X-ray images so that the images are displayed on a display. In addition, the above Japanese Patent Publication No. JP6260615 discloses that an image of the targeted part of the subject can be captured under the same conditions as its past image by comparison between the reconstructed images generated in the preliminary imaging and the past image.

Although not disclosed in the above Japanese Patent Publication No. JP6260615, even if a phase contrast image such as an absorption, differential phase or dark-field image is generated based on images of a subject that is actually captured following to such preliminary imaging, when users check the generated phase contrast image they may consequently find that neither a suitable image for suitably seeing the subject nor a suitable image type for the subject is acquired. In this case, users will capture images of the subject again whereby generating a phase contrast image based on the captured image again, and as a result such a task become a burden on the users. The above Japanese Patent Publication No. JP6260615 does not disclose any image type of reconstructed image based on preliminarily captured X-ray images and the number of such image types. Accordingly, users may not determine based on preliminary imaging whether a suitable phase contrast image type for a subject and a suitable phase contrast image for suitably seeing the subject will be acquired in actual imaging in the Talbot imaging apparatus (X-ray phase imaging apparatus) disclosed in the above Japanese Patent Publication No. JP6260615. From this viewpoint, it is desired to be able to determine prior to actual imaging whether a suitable phase contrast image type for a subject and a suitable phase contrast image for suitably seeing the subject will be acquired.

SUMMARY

The present invention is intended to solve the above problems, and one object of the present invention is to provide an X-ray phase imaging apparatus and a display method of a preview image in an X-ray phase imaging apparatus capable of allowing users to determine prior to actual imaging whether a suitable phase contrast image type for a subject and a suitable phase contrast image for suitably seeing the subject will be acquired.

In order to attain the aforementioned object, an X-ray phase imaging apparatus according to a first aspect of the present invention includes an X-ray source configured to irradiate a subject with X-rays; a detector configured to detect X-rays radiated from the X-ray source; a plurality of gratings arranged between the X-ray source and the detector; an image processor configured to generate two or more types of first phase contrast images selected from absorption, differential phase and dark-field images as preview images based on image signals of the subject produced by the X-ray source and the detector under an imaging condition simpler than an imaging condition for a second phase contrast image to be captured in actual imaging; and a controller configured to display the first phase contrast images generated by the image processor on a display.

In order to attain the aforementioned object, a display method of a preview image in an X-ray phase imaging apparatus according to a second aspect of the present invention includes a step of generating two or more types of first phase contrast images selected from absorption, differential phase and dark-field images as preview images based on image signals of a subject produced by an X-ray source and a detector under an imaging condition simpler than an imaging condition for a second phase contrast image to be captured in actual imaging; and a step of displaying the generated first phase contrast images on a display.

In the X-ray phase imaging apparatus according the first aspect of the present invention, as described above, the image processor is configured to generate two or more types of first phase contrast images selected from absorption, differential phase and dark-field images as preview images based on image signals of the subject produced by the X-ray source and the detector under an imaging condition simpler than an imaging condition for a second phase contrast image to be captured in actual imaging; and the controller is configured to display the first phase contrast images generated by the image processor on the display. Accordingly, users can see two or more types of first phase contrast images selected from absorption, differential phase and dark-field images as preview images prior to actual imaging. Consequently, users can determine prior to actual imaging whether a suitable phase contrast image type for a subject and a suitable phase contrast image for suitably seeing the subject will be acquired.

In the display method of a preview image in an X-ray phase imaging apparatus according to the second aspect of the present invention, as described above, the method includes the step of generating two or more types of first phase contrast images selected from absorption, differential phase and dark-field images as preview images based on image signals of a subject produced by an X-ray source and a detector under an imaging condition simpler than an imaging condition for a second phase contrast image to be captured in actual imaging; and the step of displaying the generated first phase contrast images on a display. Accordingly, users can see two or more types of first phase contrast images selected from absorption, differential phase and dark-field images as preview images prior to actual imaging. Consequently, users can determine prior to actual imaging whether a suitable phase contrast image type for a subject and a suitable phase contrast image for suitably seeing the subject will be acquired.

DETAILED DESCRIPTION

Embodiments embodying the present invention are hereinafter described with reference to the drawings.

Overall Configuration of X-Ray Phase Imaging Apparatus

The overall configuration of an X-ray phase imaging apparatus 100 according to one embodiment is described with reference to FIGS. 1 to 3.

Figure 1:
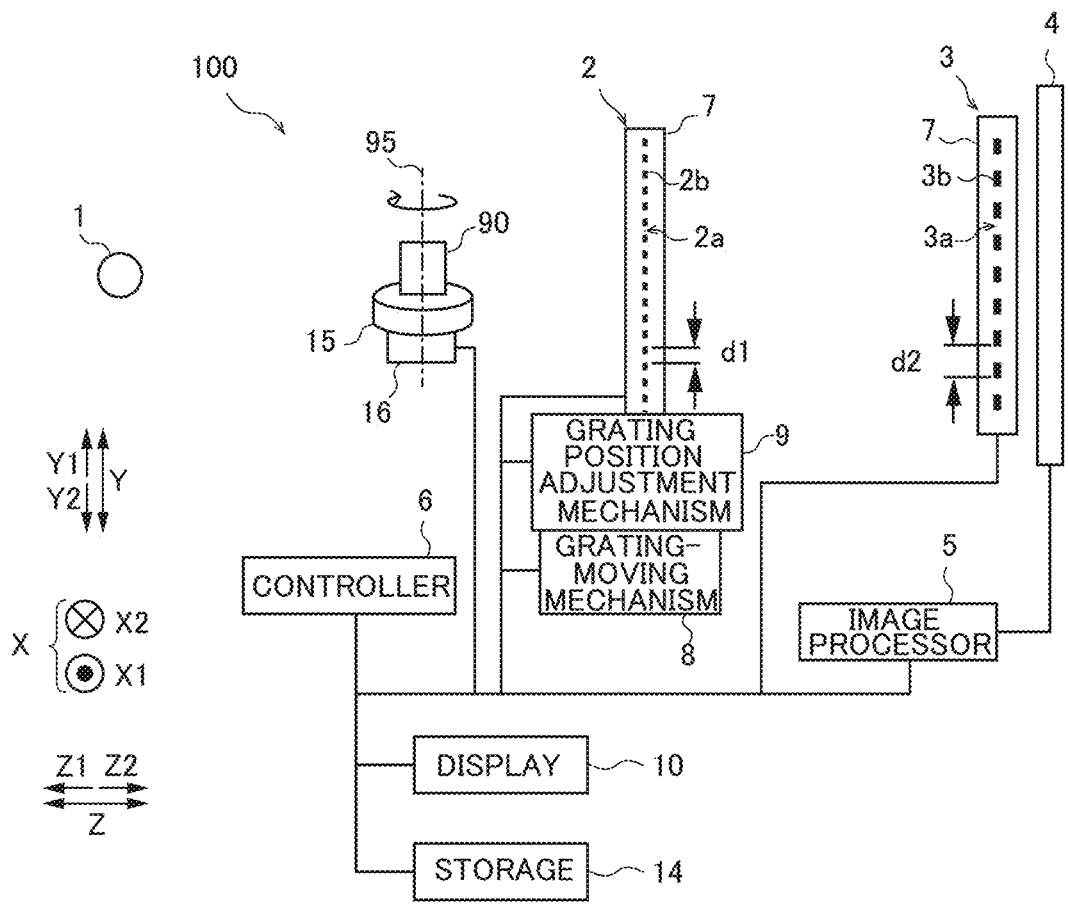
FIG. 1 is a schematic diagram showing the overall configuration of an X-ray phase imaging apparatus according to one embodiment.

As shown in FIG. 1, the X-ray phase imaging apparatus 100 is an apparatus using the Talbot effect whereby forming an image of the inside of a subject 90.

FIG. 1 is a diagram showing the X-ray phase imaging apparatus 100 as viewed in an X-direction. As shown in FIG. 1, the X-ray phase imaging apparatus 100 includes an X-ray source 1, a detector 4, a plurality of gratings including first and second gratings 2 and 3, an image processor 5, a controller 6, grating rotation mechanisms 7, a grating-moving mechanism 8, a grating position adjustment mechanism 9, a subject holder 15, a rotation mechanism 16, a display 10, and a storage 14. In this specification, a direction from the X-ray source 1 to the first grating 2 is defined as a Z2 direction, while the opposite direction is defined as a Z1 direction. Also, a leftward/rightward direction in a plane orthogonal to the Z-direction is defined as an X-direction, and a direction pointing into the paper of FIG. 1 is defined as an X2 direction while a direction pointing out of the paper of FIG. 1 is defined as an X1 direction. Also, an upward/downward direction in the plane orthogonal to the Z-direction is defined as a Y-direction, and the upward and downward directions are defined as Y1 and Y2 directions. The Z-direction is an example of an "optical axis direction of (the) X-rays" in the claims. Note that positional relationship between the controller 6, the display 10 and the storage 14 is not limited to the positional relationship of FIG. 1.

The X-ray source 1 generates X-rays when a high voltage is applied thereto. The X-ray source 1 is configured to direct X-rays in the Z2 direction when generating the X-rays.

The first grating 2 has a plurality of slits 2a and a plurality of X-ray phase changers 2b. The slits 2a and the X-ray phase changers 2b are arranged at predetermined cycles (pitches) d1 in the Y direction. Each slit 2a and each X-ray phase changer 2b linearly extend. Each slit 2a and each X-ray phase changer 2b extend in parallel to each other. The first grating 2 is a so-called phase grating.

The first grating 2 is arranged between the X-ray source 1 and the second grating 3, and is irradiated with X-rays from the X-ray source 1. The first grating 2 is provided to form a self-image 92 (see FIG. 6) of the first grating 2 by using the Talbot effect. When coherent X-rays pass through a grating in which slits are formed, a grating image (self-image 92) is formed in a position at a predetermined distance (Talbot distance) away from the grating. This is called the Talbot effect.

The second grating 3 has a plurality of X-ray transmitters 3a and a plurality of X-ray absorbers 3b. The X-ray transmitters 3a and the X-ray absorbers 3b are arranged at predetermined cycles (pitches) d2 in the Y direction. Each X-ray transmitter 3a and each X-ray absorber 3b linearly extend. In addition, each X-ray transmitter 3a and each X-ray absorber 3b extend parallel to each other. The second grating 3 is a so-called absorption grating. The first and second gratings 2 and 3, which are different types of gratings serving different functions, pass X-rays through the slits 2a and the X-ray transmitters 3a, respectively. The X-ray absorbers 3b cut off X-rays. The X-ray phase changers 2b change an X-ray phase in accordance with the refractive index difference between the X-ray phase changer 2b and the slit 2a.

The second grating 3 is arranged between the first grating 2 and the detector 4, and is irradiated with X-rays that have passed through the first grating 2. The second grating 3 is spaced at the predetermined Talbot distance away from the first grating 2. The second grating 3 is configured to interfere with the self-image 92 of the first grating 2 so as to form moire fringes (see FIG. 2) on a detection surface of the detector 4.

The detector 4 is configured to detect X-rays and convert the detected X-rays into electrical signals so as to read the converted electrical signals as image signals. The detector 4 is a flat panel detector (FPD), for example. The detector 4 includes a plurality of conversion elements (not shown) and pixel electrodes (not shown) arranged on the plurality of conversion elements. The plurality of conversion elements and the pixel electrodes are aligned at predetermined cycles (pixel pitches) along the X and Y directions so as to be arranged in an array. In addition, the detector 4 is configured to provide the read image signals to the image processor 5.

The image processor 5 can generate first phase contrast 20 images 20 (see FIG. 2) as preview images based on image signals of the subject 90 produced by the X-ray source 1 and the detector 4 under imaging conditions simpler than imaging conditions for second phase contrast images 24 to be captured in actual imaging. The first phase contrast images 20 include 25 an absorption image 25 (see FIG. 7), a differential phase image 26 (see FIG. 7) and a dark-field image 27 (see FIG. 7). The absorption image 25 (see FIG. 7), the differential phase image 26 (see FIG. 7) and the dark-field image 27 (see FIG. 7) are hatched with different hatch patterns for showing that they are different types of images. The imaging conditions for preview images will be discussed in detail later.

Also, the image processor 5 is configured to generate the second phase contrast images 24 (see FIG. 7) based on image signals of the subject 90 produced by the X-ray source 1 and the detector 4 under imaging conditions for the actual imaging. The second phase contrast images 24 (see FIG. 7) include an absorption image 25 (see FIG. 7), a differential phase image 26 (see FIG. 7) and a dark-field image 27 (see FIG. 7). The image processor 5 is configured to generate as a second phase contrast image 24 a phase contrast image that corresponds to a type that is selected from the three types of the first phase contrast images 20, which are the absorption image 25, the differential phase image 26 and the dark-field image 27, by a user who can see the three types of the first phase contrast images 20. The absorption image 21 (see FIG. 2), the differential phase image 22 (see FIG. 2) and the dark-field image 23 (see FIG. 2) are hatched with different hatch patterns for showing that they are different types of images. The imaging conditions for the actual imaging will be discussed in detail later.

The image processor 5 is configured to generate three-dimensional CT (Computed Tomography) images 40 (see FIG. 8) based on a plurality of second phase contrast images 24 that are generated when captured while the subject 90 is rotated relative the X-ray source 1, the detector 4 and the plurality of gratings. The three-dimensional CT images 40 include a CT image 41 of the absorption images (see FIG. 8), a CT image 42 of the differential phase images (see FIG. 8) and a CT image 43 of the dark-field images (see FIG. 8). The image processor 5 is configured to generate one or more CT images 40 that correspond to one or more types that are selected by a user who can see the three types of the first phase contrast images 20 from the three types of CT images 40, which are the CT image 41 of the absorption images, the CT image 42 of the differential phase images and the CT image 43 of the dark-field images. The CT image 41 (see FIG. 8) of the absorption images, the CT image 42 (see FIG. 8) of the differential phase images and the CT image 43 (see FIG. 8) of the dark-field images are hatched with different hatch patterns for showing that they are different types of images.

The absorption image is an image subjected to phase processing based on attenuation of X-rays that are attenuated when the X-rays pass through the subject 90. The differential phase image is an image subjected to phase processing based on a phase shift of X-rays when the X-rays pass through the subject 90. The dark-field image is a visibility image subjected to phase processing based on a change in visibility in accordance with on small-angle scattering of an object. The dark-field image is also called a small-angle scattering image. The "visibility" denotes sharpness of the self-image 92.

The image processor 5 is configured to generate a real-time display image 28 based on detection signals of the subject 90 generated by the X-ray source 1 and the detector 4. The real-time display image 28 is a moving image that is obtained by updating the latest one of sequential X-ray images of the subject 90 irradiated with X-rays from the X-ray source 1, and is also referred to as a fluoroscopic image. The real-time display image 28 may be a still image corresponding to one of the time-lapse X-ray images of the subject 90 irradiated with X-rays from the X-ray source 1. The real-time display image 28 is formed of an X-ray image that is not subjected to phase processing. For this reason, the real-time display image 28 will include moire fringes 91 (see FIG. 2).

The image processor 5 includes a processor such as a graphics processing unit (GPU) or a field-programmable gate array (FPGA) configured for image processing, for example.

Figure 2:
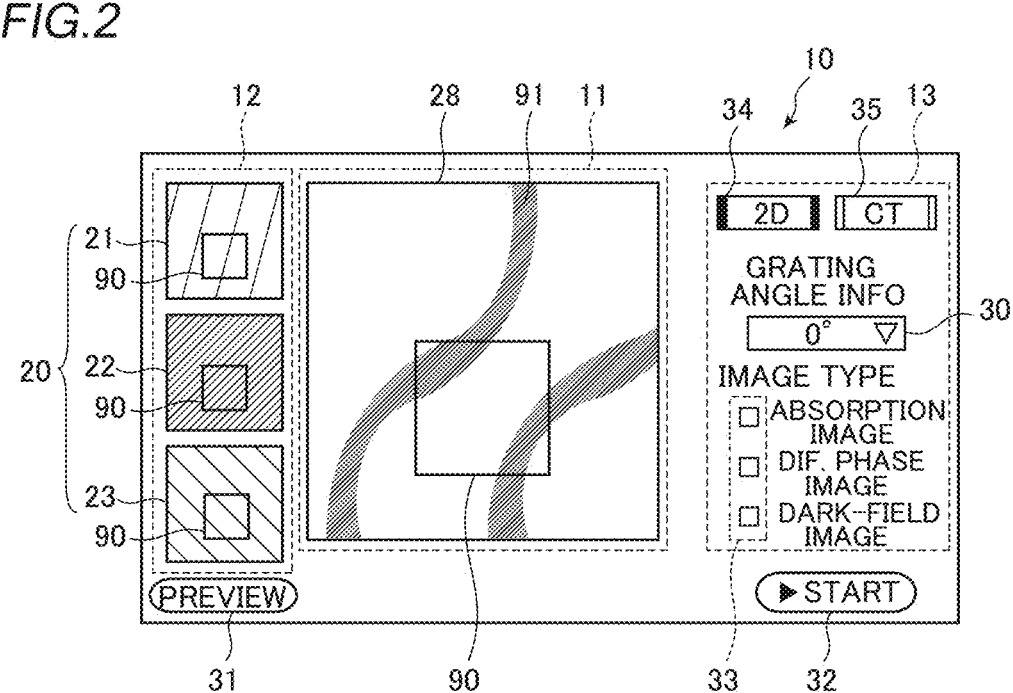
FIG. 2 is a schematic diagram showing an exemplary display.

As shown in FIG. 2, the display 10 has a first area 11 displaying the real-time display image 28, a second area 12 displaying the three types of the first phase contrast images 20, and a third area 13 displaying grating angle information 30 on the plurality of gratings on its common screen. The display 10 includes an LCD monitor, for example. The display 10 will be discussed in detail later.

As shown in FIG. 1, the controller 6 is configured to rotate the gratings by using the grating rotation mechanisms 7 so as to vary an orientation (grating rotation angle) of each grating relative to the subject 90. In addition, the controller 6 is configured to move the first grating 2 in a vertical direction (Y-direction) or a lateral direction (X-direction) in a grating plane by using the grating-moving mechanism 8. In addition, the controller 6 is configured to rotate the subject 90 about a rotation axis 95 by using the rotation mechanism 16 so as to rotate the subject 90 relative to the X-ray source 1, the detector 4 and the plurality of gratings.

Also, as shown in FIG. 2, the controller 6 is configured to display the real-time display image 28, the three types of the first phase contrast images 20, which are the absorption image 21, the differential phase image 22 and the dark-field image 23, and the grating angle information 30 on the display 10. The controller 6 is configured to display on the display 10 the three types of the first phase contrast images 20, which are the absorption image 21, the differential phase image 22 and the dark-field image 23, generated based on common image signals provided from the detector 4.

Also, the controller 6 is configured to display the first phase contrast images 20 in a thumbnail size in the second area 12, which is located in proximity to the first area 11 in which the real-time display image 28 is displayed. Also, as shown in FIG. 3, the controller 6 is configured to display one first phase contrast image 20 that is selected by a user from the first phase contrast images 20, which have been displayed in a thumbnail size, larger than the thumbnail size. For example, the controller 6 includes a processor such as CPU (Central Processing Unit).

As shown in FIG. 1, the grating rotation mechanisms 7 are configured to rotate the first and second gratings 2 and 3 in a plane orthogonal to the optical axis direction of X-rays based on a signal from the controller 6. Specifically, each of the first and second gratings 2 and 3 are provided with its corresponding grating rotation mechanism 7. The grating rotation mechanism 7 is configured to rotate the corresponding grating so as to vary an orientation of each grating relative to the subject 90. The configuration of the grating rotation mechanism 7 for rotating the grating will be described in detail later.

The grating-moving mechanism 8 is configured to move the first grating 2 in the vertical direction (Y-direction) or the lateral direction (X-direction) based on a signal from the controller 6. The vertical direction is defined by a direction corresponding to approximately 90 degrees of an orientation of the grating with reference to the horizontal direction (X-direction) orthogonal to the optical axis direction of X-rays (Z-direction). The lateral direction is defined by a direction corresponding to approximately zero degrees of an orientation of the grating with reference to the horizontal direction (X-direction) orthogonal to the optical axis direction of X-rays (Z-direction). The configuration of the grating-moving mechanism 8 for moving the grating will be described in detail later. In addition, the grating-moving mechanism 8 is configured to hold the grating rotation mechanism 7 through the grating position adjustment mechanism 9.

The grating position adjustment mechanism 9 is configured to move the first grating 2 whereby adjusting a relative position between the plurality of gratings based on a signal from the controller 6. The configuration of the grating position adjustment mechanism 9 for adjusting the relative position between the plurality of gratings will be described in detail later.

The subject holder 15 is arranged between the X-ray source 1 and the detector 4, and is configured to hold the subject 90. The subject 90 can be held to the subject holder 15 through an attachment (not shown) for holding the subject 90.

The rotation mechanism 16 is configured to rotate the subject holder 15 relative to the X-ray source 1, the detector 4 and the plurality of gratings based on a signal from the controller 6. The rotation mechanism 16 is configured to rotate the subject holder 15 about the rotation axis 95 whereby rotating the subject holder 15 relative to the X-ray source 1, the detector 4 and the plurality of gratings. The rotation mechanism 16 is a mechanism that can rotate the subject holder 15, and includes electric motors, etc., for example.

The storage 14 is configured to store a program to be executed by the controller 6, the first phase contrast images 20, the second phase contrast image 24 and the CT image 40, which are generated by the image processor 5, the imaging conditions for the actual imaging, the imaging conditions for the preview images, the grating angle information 30, etc. The storage 14 includes a hard disk drive (HDD) or a nonvolatile memory, for example.

Grating Rotation, Grating-Moving and Grating Position Adjustment Mechanisms

The configurations of the grating rotation mechanism 7, the grating-moving mechanism 8 and the grating position adjustment mechanism 9 are described with reference to FIGS. 4 and 5.

Figure 4:
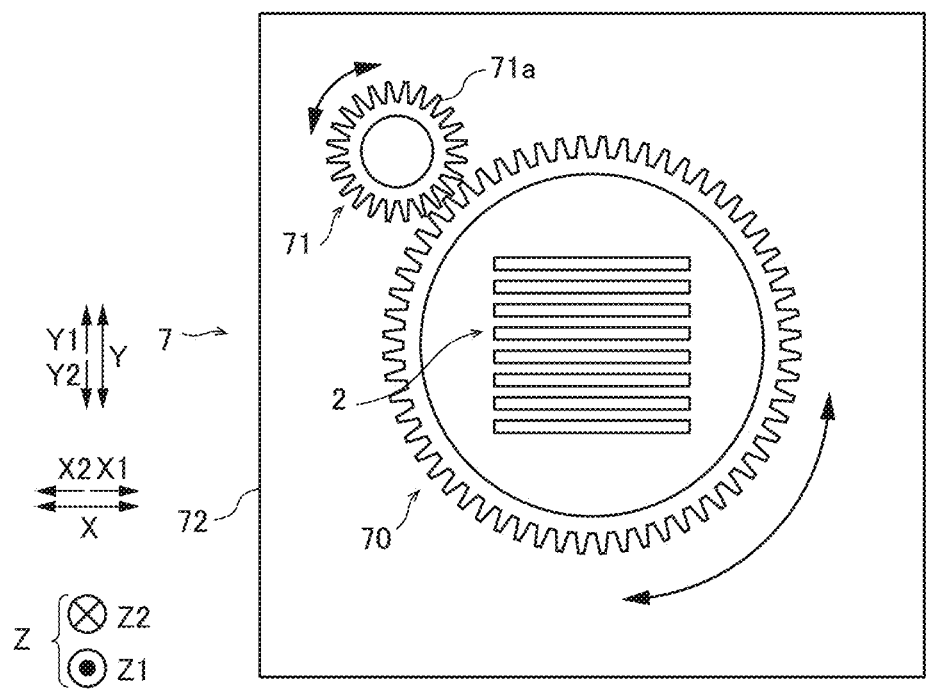
FIG. 4 is a schematic diagram showing an exemplary grating rotation mechanism.

As shown in FIG. 4, the grating rotation mechanism 7 includes a grating retainer 70 configured to retain its corresponding grating, a rotator 71 configured to rotate the grating retainer 70, and a housing 72. The grating retainer 70 is rotatably supported in the housing 72. The grating retainer 70 is configured to retain its corresponding one of the first and second gratings 2 and 3 on its interior side in contact with the first or second grating 2 or 3. The grating retainer 70 has a disk shape. In addition, teeth are formed on the outer peripheral surface of the grating retainer 70.

The rotator 71 includes a driver (not shown) and a rotating part 71a. The driver includes an electric motor, an encoder, etc. The rotating part 71a has a disk shape. In addition, teeth are formed on the outer peripheral surface of the rotating part 71a. The rotating part 71a is configured to be rotated by the driver. An angle to which each grating is rotated by the grating rotation mechanism 7 can be displayed as the grating angle information 30 in the third area 13 of the display 10. Although FIG. 4 illustrates the grating rotation mechanism 7 that is configured to rotate the first grating 2, the grating rotation mechanism 7 that is configured to rotate the second grating 3 has the similar stricture to the grating rotation mechanism 7 that is configured to rotate the first grating 2.

Figure 5:
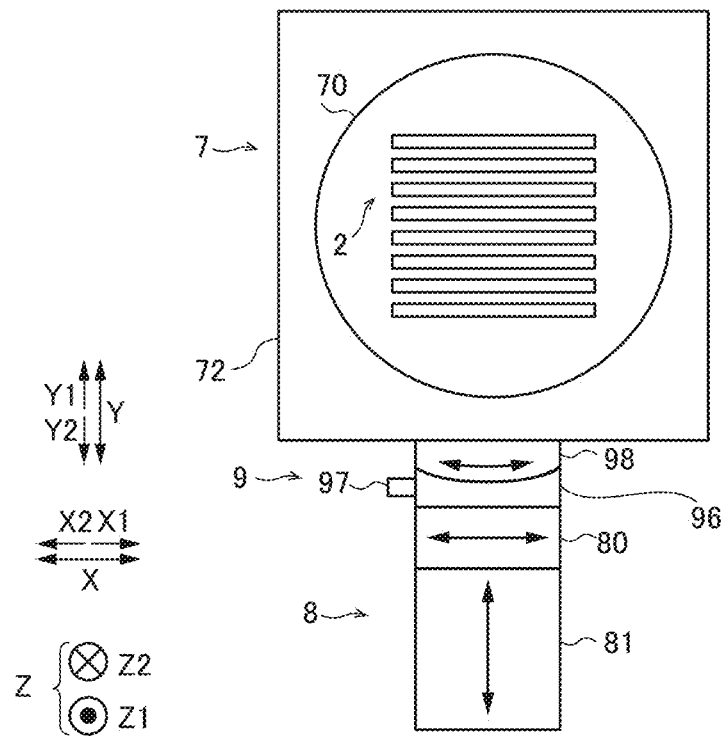
FIG. 5 is a schematic diagram showing an exemplary grating-moving mechanism.

As shown in FIG. 5, the grating-moving mechanism 8 is configured to move the grating in the vertical direction (Y-direction) or the lateral direction (X-direction) in a plane (XY plane) that is orthogonal to the optical axis direction (Z-direction). Specifically, as shown in FIG. 5, the grating-moving mechanism 8 includes X-directional and Y-directional translation mechanisms 80 and 81. The X-directional translation mechanism 80 is configured to be able to translationally move in the X-direction. For example, the X-directional translation mechanism 80 includes a stepping motors, etc. The Y-directional translation mechanism 81 is configured to be able to translationally move in the Y-direction. For example, the Y-directional translation mechanism 81 includes a stepping motors, etc. The grating-moving mechanism 8 is configured to translate the grating rotation mechanism 7 in the X-direction through the grating position adjustment mechanism 9 by using movement of the X-directional translation mechanism 80. Also, the grating-moving mechanism 8 is configured to translate the grating rotation mechanism 7 in the Y-direction through the grating position adjustment mechanism 9 by using movement of the Y-directional translation mechanism 81. In other words, the grating-moving mechanism 8 is configured to move the first grating 2 together with the grating rotation mechanism 7.

As shown in FIG. 5, the grating position adjustment mechanism 9 is arranged on the grating-moving mechanism 8. The grating position adjustment mechanism 9 includes a stage supporter 96, a driver 97 and a stage 98. The stage supporter 96 supports the stage 98 from its lower side (in the Y1 direction). The driver 97 is configured to move the stage supporter 96 back and forth in the X-direction. The stage 98 has a convex bottom shape bulging toward the stage supporter 96, and is configured to rotate about its center axis extending in the Z-direction when moving back and forth in the X-direction. Dissimilar to the grating rotation mechanism 7, which is configured to vary orientation of its corresponding grating by rotating the grating in a large range, the grating position adjustment mechanism 9 is configured to finely adjust an angle of the grating in the XY plane.

(Translation of Grating)

Figure 6:
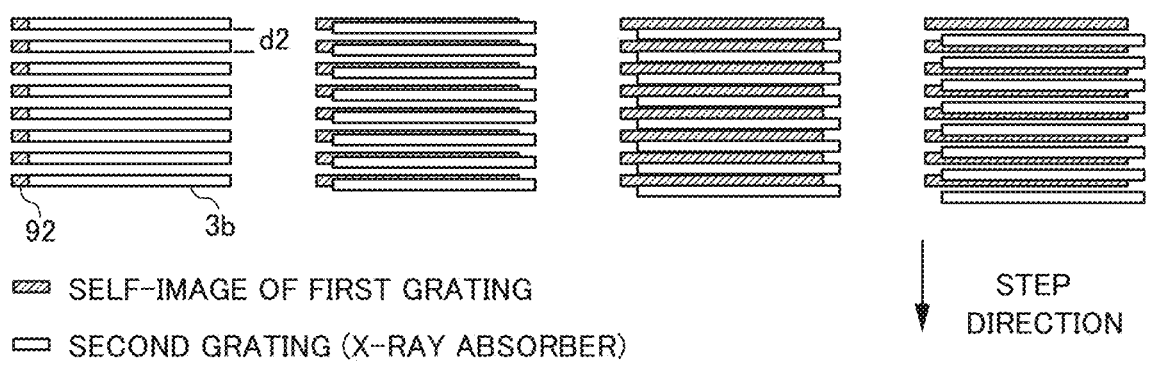
FIG. 6 is an illustration illustrating translation of gratings.
Figure 6:
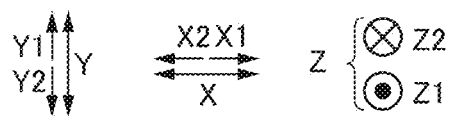

Control by the controller 6 that translates the grating by using the grating-moving mechanism 8 is described with reference to FIG. 6. In this embodiment, the image processor 5 is configured to generate the first phase contrast images 20 and the second phase contrast image 24 by fringe scanning. The fringe scanning is a technique that generates an image based on a detection signal curve (step curve) of X-rays detected when images are captured while one of the gratings is translated not smaller than one cycle of another grating. In this embodiment, the grating-moving mechanism 8 is configured to translate the first grating 2 by not smaller than one cycle (d2) of the second grating 3. FIG. 6 is a schematic diagram showing translation of the grating, which is aligned in an exemplary lateral orientation (extends in the X-direction). In the case in which the grating is aligned in the lateral orientation (extends in the X-direction), the controller 6 will translate the first grating 2 in the Y2 direction by using the grating position adjustment mechanism 9.

Configuration of Display

The display 10 is described in detail with reference to FIG. 2. The display 10 has the first area 11 displaying the real-time display image 28, the second area 12 displaying the three types of the first phase contrast images 20, and the third area 13 displaying grating angle information 30 on the plurality of gratings.

The first area 11 can display the real-time display image 28 captured in accordance with a grating angle specified.

The second area 12 can display three types of the first phase contrast images 20 generated as preview images. An exemplary second area 12 is located on the left side relative to the first area 11 in the display 10. The second area 12 includes sections corresponding to the absorption image 21, the differential phase image 22 and the dark-field image 23, which are the first phase contrast images 20 generated, are arranged in this order from the top to the bottom of the second area in the display 10. No first phase contrast image 20 can be displayed in the second area 12 before the three types of the first phase contrast images 20 as the preview images are generated.

The controller 6 (see FIG. 1) is configured to display the three types of the first phase contrast images 20 as thumbnails on the display 10. Displaying the first phase contrast images as thumbnails refers to displaying reduced first phase contrast images 20 whereby improving legibility of the first phase contrast images 20. The controller 6 is configured to adjust sizes of three types of the first phase contrast images 20 generated by the image processor 5 to a predetermined size suitable for the thumbnail displaying. The controller 6 is configured to place the adjusted three types of first phase contrast images 20 on their corresponding sections in the second area 12 for the thumbnail displaying.

Figure 3:
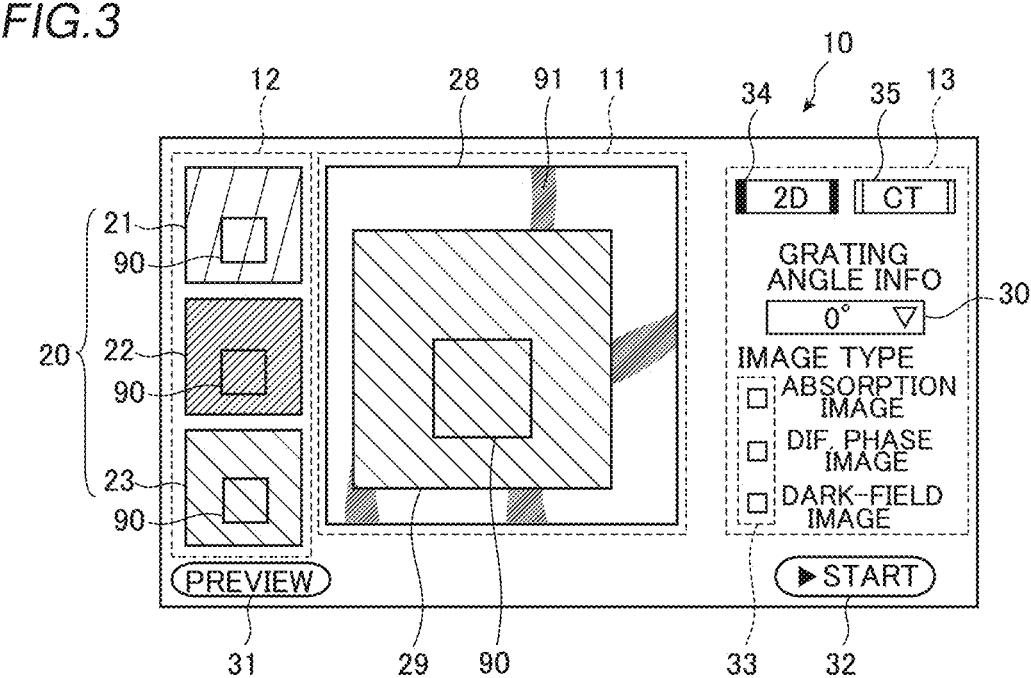
FIG. 3 is a schematic diagram showing an exemplary enlarged first phase contrast image.

Also, as shown in FIG. 3, the controller 6 (see FIG. 1) is configured to display one first phase contrast image 20 that is selected from the first phase contrast images 20, which have been displayed in a thumbnail size, larger than the thumbnail size. For example, the controller 6 is configured to display as a pop-up image one first phase contrast image 20 that is selected by a click from the first phase contrast images 20, which have been displayed in a thumbnail size, in a size of the first phase contrast image 20 before reduced, which is larger than the thumbnail size. The dark-field image 23 that is selected by a user is displayed in a pop-up form as an exemplary pop-up image 29 in FIG. 3. In a case of pop-up displaying, the controller 6 can be configured to display one first phase contrast image 20 that is selected by a click as a pop-up image without overlapping the second area 12, for example.

The third area 13 can display the grating angle information 30 on the plurality of gratings specified by a user. The grating angle information 30 can be displayed in a pull-down menu form that allows users to select desired one from a plurality of predetermined grating angles. Note that the grating angle information 30 can be provided not by the selection using the pull-down menu form but by input of a numerical value corresponding to a desired grating angle entered by a user.

Also, the display 10 can display a first start button 31 for starting capture of preview images, a second start button 32 for starting actual imaging, and a checkbox 33 for selecting a type of second phase contrast image 24 to be generated or a type of CT image 40 to be generated based on second phase contrast images 24 in the actual imaging. The first start button 31, the second start button 32 and the checkbox 33 are displayed as GUI (Graphical User Interface) on the display 10.

The first start button 31 is a button icon that can start capturing first phase contrast images 20 as the preview images in response to a click of an input device (not shown) including a keyboard and a mouse by a user. The image processor 5 (see FIG. 1) can generate the first phase contrast images 20 based on an input signal of the click on the first start button 31. In this embodiment, the first start button 31 is arranged under the second area 12. Note that the position of the first start button 31 is not specifically limited.

The second start button 32 is a button icon that can start capturing the second phase contrast image 24 in the actual imaging in response to a click by a user. The image processor 5 (see FIG. 1) can generate the second phase contrast image 24 based on an input signal of the click on the second start button 32. In this embodiment, the second start button 32 is arranged in a right-side lower part of the display 10. Note that the position of the second start button 32 is not specifically limited.

The checkbox 33 is provided to select a type of second phase contrast image 24 to be generated or a type of CT image 40 to be generated based on second phase contrast images 24 in the actual imaging in accordance with the checked state of the checkbox selected by a user. Users can select one or more images from the absorption image 25, the differential phase image 26 and the dark-field image 27 to be generated as the second phase contrast images 24. Also, users can select one or more images from the CT image 41 of the absorption images, the CT image 42 of the differential phase images and the CT image 43 of the dark-field images to be generated as the CT images 40 based on the second phase contrast images 24 generated.

In addition, the display 10 can display a first tab 34 for displaying a screen including information on capture of the two-dimensional second phase contrast image 24, and a second tab 35 for displaying a screen including information on capture of the CT image 40. The display 10 can display one of the screen including information on capture of the two-dimensional second phase contrast image 24 and the screen including information on capture of the CT image 40 in response to switching between the first tab 34 and the second tab 35. FIG. 2 illustrates the screen including information on capture of the two-dimensional second phase contrast image 24 for ease of illustration. The first tab 34 and second tab 35 are displayed as GUI (Graphical User Interface) on the display 10.

First Phase Contrast Image as Preview Image

The first phase contrast images 20 as the preview images are described with reference to FIG. 2.

The image processor 5 (see FIG. 1) can generate the first phase contrast images 20 as the preview images before the second phase contrast image is generated in the actual imaging. The image processor 5 can generate the first phase contrast images 20 based on the input signal of the click on the first start button 31 in the display 10 by a user. The image processor 5 can generate the three types of first phase contrast images 20, which are the absorption image 21, the differential phase image 22 and the dark-field image 23. The image processor 5 can generate the first phase contrast images 20 based on image signals of the subject 90 produced by the X-ray source 1 and the detector 4 under imaging conditions simpler than imaging conditions for the actual imaging.

The imaging conditions for preview imaging are previously specified simpler than the imaging conditions for the actual imaging. X-ray irradiation time (exposure time) for capture of the preview image as one example of the imaging conditions for the preview images is shorter than the actual imaging. Specifically, exemplary X-ray irradiation time (exposure time) for capture of one X-ray image as the preview image is set 250 msec. Exemplary X-ray irradiation time (exposure time) for one X-ray image in the actual imaging is set 500 msec.

Also, the number of imaging shots for capture of the preview image as one example of the imaging conditions for the preview images is smaller than the imaging condition for the actual imaging. Specifically, the number of imaging shots for capture of the preview image as one example is one. The number of imaging shots in the actual imaging as one example is not smaller than two. Here, the number of imaging shots refers to the number of images captured at the same position of each grating to be superimposed on each other for noise reduction.

In fringe scanning, a plurality of X-ray images are captured at different grating positions while one of the gratings is translated not smaller than one cycle of another grating so that a plurality of X-ray images at different positions are generated. In this fringe scanning, images that are captured at the same position of each grating can be superimposed on each other for noise reduction for each of the X-ray images at different positions. That is, the total number of images captured at the same position to be superimposed in the preview imaging is one, while the total number of images captured at the same position to be superimposed in the actual imaging is not smaller than two.

Dissimilar to the actual imaging in which an image without subject (reference image but not shown) is captured at predetermined timing, exemplary preview imaging reuses a reference image that has been captured in another shot. Here, the reference image refers to an image that is captured without the subject 90 placed on the subject holder before an image of the subject 90 is captured, for example. The image processor 5 is configured to apply phase processing to an image based on ratios between average value images with and without the subject, and to generate the absorption image 21. The image processor 5 is configured to apply phase processing to an image based on differences between phase images with and without the subject, and to generate the differential phase image 22. The image processor 5 is configured to apply phase processing to an image based on ratios between visibility images with and without the subject, and to generate the dark-field image 23. The image processor 5 is configured to generate a reference image in preview imaging if any reference image has not been captured in another shot.

The image processor 5 (see FIG. 1) can generate a first phase contrast image 20 as a preview image that will be captured in preview imaging by using a reference image that has been captured at the same tube voltage and grating angle as this preview imaging in the last shot as an exemplary reference image in preview imaging. For example, in a case in which a preview image will be captured in preview imaging under imaging conditions of tube voltage 40 kV, X-ray tube current 450 µA and grating angle 0 degree, the following reference images A to C, which have been captured in other shots, are considered.

Reference image A has been captured at tube voltage 50 kV, X-ray tube current 800 µA and grating angle 0 degree one hour before this preview imaging.

Reference image B has been captured at tube voltage 40 kV, X-ray tube current 800 µA and grating angle 9 degree two hours before this preview imaging.

Reference image C has been captured at tube voltage 40 kV, X-ray tube current 800 µA and grating angle zero degree three hours before this preview imaging.

In this case, the image processor 5 will generate a first phase contrast image 20 as a preview image that will be captured in this preview imaging by using the reference image C, which has been captured at the same tube voltage and grating angle as this preview imaging.

Accordingly, the image processor 5 (see FIG. 1) can generate three types of first phase contrast images 20, which are the absorption image 21, the differential phase image 22 and the dark-field image 23, as preview images within a shorter time than actual imaging. In addition, the controller 6 (see FIG. 1) can display the three types of first phase contrast images 20, which are the absorption image 21, the differential phase image and the dark-field image 23, in a thumbnail size as preview images generated within a shorter time in the second area 12 of the display 10.

Second Phase Contrast Image

Figure 7:
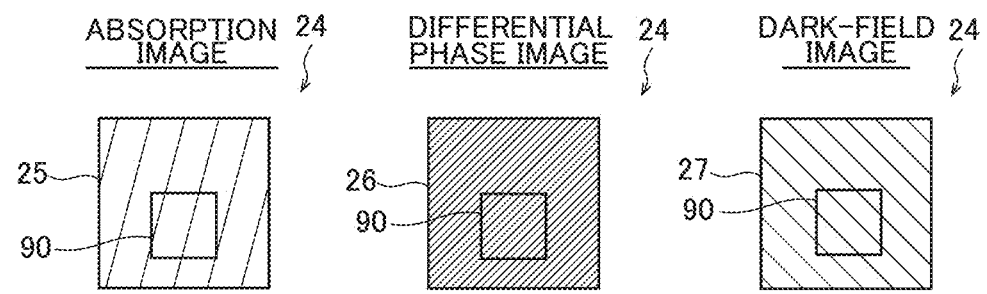
FIG. 7 is a schematic diagram showing exemplary second phase contrast images captured in actual imaging.

The second phase contrast images 24 to be captured in actual imaging are described with reference to FIG. 7.

The image processor 5 (see FIG. 1) is configured to generate the second phase contrast image 24 captured under imaging conditions for the actual imaging. The image processor 5 can generate the second phase contrast image 24 based on an input signal of a click on the second start button 32 in the display 10 by a user. The image processor 5 can generate one or more second phase contrast images 24 that correspond to one or more types selected from the absorption image 25, the differential phase image 26 and the dark-field image 27, in accordance with the checked state of the checkbox 33 in the display 10 selected by a user.

The image processor 5 (see FIG. 1) is configured to generate the second phase contrast images 24 captured under the aforementioned imaging conditions for actual imaging. The image processor 5 can generate the second phase contrast images 24 based on information on imaging conditions such as tube voltage, X-ray tube current, grating angle of each grating specified through the display 10. Also, the image processor 5 is configured to generate a reference image in predetermined timing.

CT Image

Figure 8:
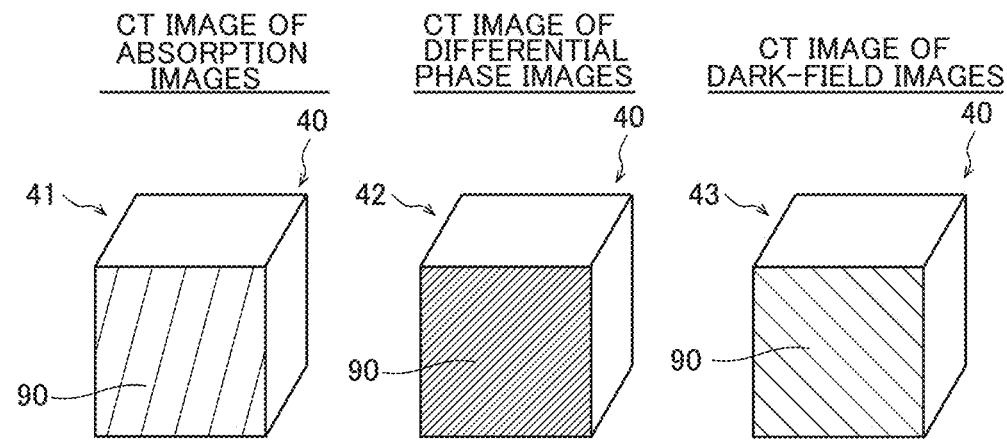
FIG. 8 is a schematic diagram showing exemplary CT images captured in actual imaging.

The CT image 40 to be captured in actual imaging is described with reference to FIG. 8.

The image processor 5 (see FIG. 1) is configured to generate the second phase contrast image 24 captured under imaging conditions for the actual imaging. The image processor 5 can generate the second phase contrast image 24 based on an input signal of a click on the second start button 32 in the display 10 by a user. The image processor 5 can generate one or more second phase contrast images 24 that correspond to one or more types selected from the absorption image 25, the differential phase image 26 and the dark-field image 27, in accordance with the checked state of the checkbox 33 in the display 10 selected by a user.

The image processor 5 can generate the CT image 40 based on the second phase contrast images 24 generated. The image processor 5 can generate one or more CT images 40 selected from the CT image 41 of the absorption images, the CT image 42 of the differential phase images and the CT image 43 of the dark-field images.

Figure 9:
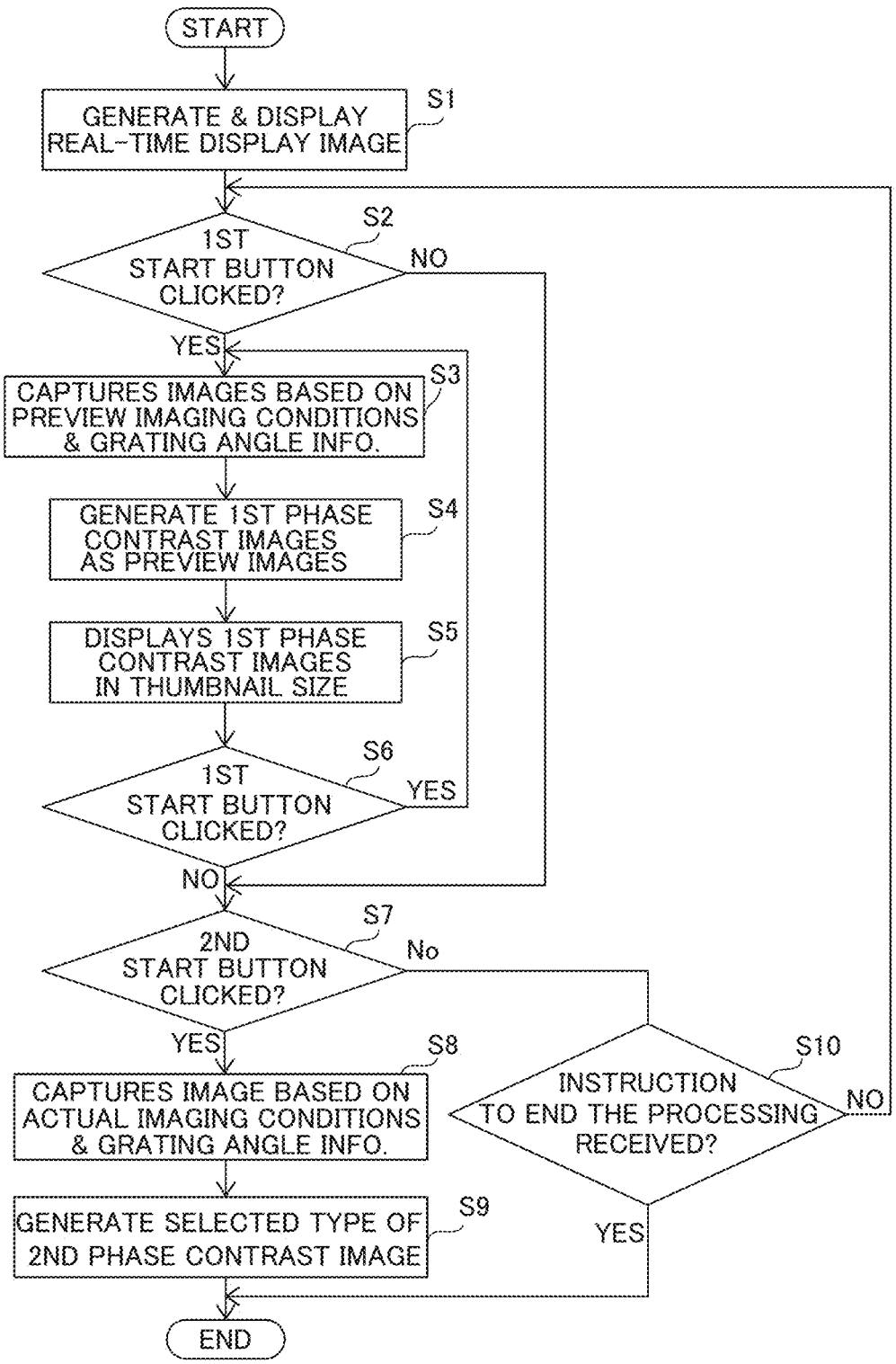
FIG. 9 is a flowchart illustrating processes of generating and displaying first phase contrast images, and a process of generating a second phase contrast image.

Generation and Display Processing of First Phase Contrast Images, and Generation Processing of Second Phase Contrast Image or CT Image Generation processing of the first phase contrast images 20, the second phase contrast image 24 and the CT image 40 by the image processor 5, and display processing by the controller 6 in this embodiment are described with reference to FIG. 9.

In step S1, the image processor 5 generates a real-time display image 28 based on detection signals of the subject 90 generated by the X-ray source 1 and the detector 4 as a moving image that is obtained by updating the latest one of sequential images of the subject 90. The controller 6 displays the real-time display image 28 generated by the image processor 5 in the first area 11 of the display 10. Subsequently, the procedure goes to step S2.

In step S2, the image processor 5 determines whether the first start button 31 is clicked. The procedure goes to step S3 if the image processor 5 determines that the first start button 31 is clicked (Yes in step S2), or goes to step S7 if the image processor 5 determines that the first start button 31 receives no click (No in step S2).

In step S3, the controller 6 captures images of the subject 90 in accordance with imaging conditions for preview imaging stored in the storage 14 and grating angle information 30 specified through the display 10. Subsequently, the procedure goes to step S4.

In step S4, the image processor 5 can generate the three types of first phase contrast images 20, which are the absorption image 21, the differential phase image 22 and the dark-field image 23, as the preview images. Subsequently, the procedure goes to step S5.

In step S5, the controller 6 displays the three types of first phase contrast images 20, which are the absorption image 21, the differential phase image and the dark-field image 23 generated by the image processor 5, in a thumbnail size in the second area 12 of the display 10. Subsequently, the procedure goes to step S6.

In step S6, the image processor 5 determines whether the first start button 31 is clicked. The procedure goes to step S3 if the image processor 5 determines that the first start button 31 is clicked (Yes in step S6), or goes to step S7 if the image processor 5 determines that the first start button 31 receives no click (No in step S6).

In step S7, the image processor 5 determines whether the second start button 32 is clicked. The procedure goes to step S8 if the image processor 5 determines that the second start button 32 is clicked (Yes in step S7), or goes to step S10 if the image processor 5 determines that the second start button 32 receives no click (No in step S7).

In step S8, the controller 6 captures a reference image and images of the subject 90 in accordance with imaging conditions for actual imaging and grating angle information 30 specified through the display 10. Subsequently, the procedure goes to step S9.

In step S9, the image processor 5 acquires one or more types of second phase contrast images 24 or CT images 40 that have been selected by a user who can see the three types of the first phase contrast images 20, which are the absorption image 25, the differential phase image 26 and the dark-field image 27, and generates the second phase contrast image 24 or the CT image 40 acquired corresponding to the one or more types selected by the user. After that, the procedure ends.

In step S10, the controller 6 determines whether an input instruction to end generation processing of the first phase contrast image 20, the second phase contrast image 24 and the CT image 40 by the image processor 5, and display processing by the controller 6 is received. The procedure ends if the controller 6 determines that the instruction to end the processing is received (Yes in step S10), or returns to step S2 if the controller 6 determines that no instruction to end the processing is received (No in step S10).

Effect of the Invention

In this embodiment, the following advantages are obtained.

In this embodiment, as discussed above, an X-ray phase imaging apparatus 100 includes an X-ray source 1 configured to irradiate a subject 90 with X-rays; a detector 4 configured to detect X-rays radiated from the X-ray source 1; a plurality of gratings 2 and 3 arranged between the X-ray source 1 and the detector 4; an image processor 5 configured to generate two or more types of first phase contrast images 20 selected from absorption, differential phase and dark-field images 21, 22 and 23 as preview images based on image signals of the subject 90 produced by the X-ray source 1 and the detector 4 under an imaging condition simpler than an imaging condition for a second phase contrast image 24 to be captured in actual imaging; and a controller 6 configured to display the first phase contrast images 20 generated by the image processor 5 on a display 10. The image processor 5 is configured to generate two or more types of first phase contrast images 20 selected from absorption, differential phase and dark-field images 21, 22 and 23 as preview images based on image signals of the subject 90 produced by the X-ray source 1 and the detector 4 under an imaging condition simpler than an imaging condition for a second phase contrast image 24 to be captured in actual imaging, and the controller 6 is configured to display the generated first phase contrast images 20 on the display 10. Accordingly, users can see three types of first phase contrast images 20, which are the absorption, differential phase and dark-field images 21, 22 and 23, as preview images prior to actual imaging. Consequently, users can determine prior to actual imaging whether a suitable phase contrast image 20 type for a subject 90 and a suitable phase contrast image 20 for suitably seeing the subject 90 will be acquired.

In this embodiment, as discussed above, a display method of a preview image in an X-ray phase imaging apparatus 100 includes a step of generating two or more types of first phase contrast images 20 selected from absorption, differential phase and dark-field images 21, 22 and 23 as preview images based on image signals of a subject 90 produced by an X-ray source 1 and a detector 4 under an imaging condition simpler than an imaging condition for a second phase contrast image 24 to be captured in actual imaging; and a step of displaying the generated first phase contrast images 20 on a display 10. Accordingly, users can see three types of first phase contrast images 20, which are the absorption, differential phase and dark-field images 21, 22 and 23, as preview images prior to actual imaging. Consequently, users can determine prior to actual imaging whether a suitable phase contrast image 20 type for a subject 90 and a suitable phase contrast image 20 for suitably seeing the subject 90 will be acquired.

In addition, the following additional advantages can be obtained by the aforementioned embodiment added with configurations discussed below.

That is, in this embodiment, as discussed above, the controller 6 is configured to display a real-time display image 28 of the subject 90 irradiated with X-rays from the X-ray source 1 in real time and the three types of first phase contrast images 20 in a common screen of the display 10. Accordingly, when users compare the real-time display image 28 and the first phase contrast images 20 with each other, legibility in this case for the users can be improved in comparison with a case in which the real-time display image 28 and the first phase contrast images 20 are displayed in different screens. As a result, users can easily compare the real-time display image 28 and the first phase contrast images 20 with each other.

In this embodiment, as discussed above, the controller 6 is configured to display the three types of first phase contrast images 20 in a thumbnail size in an area in proximity to a display area for the real-time display image 28. Accordingly, while reduction of legibility is minimized, the three types of first phase contrast images 20 can be displayed in a limited area in proximity to the display area for the real-time display image 28. As a result, users can more easily compare the real-time display image 28 and the first phase contrast images 20 with each other.

In this embodiment, as discussed above, the X-ray phase imaging apparatus further includes a grating rotation mechanism configured to rotate the plurality of gratings in a plane orthogonal to an optical axis direction of the X-rays, wherein the controller 6 is configured to further display angle information on the plurality of gratings on the display 10. Accordingly, users can easily know the angle information on the plurality of gratings in the three types of first phase contrast images 20. As a result, users can appropriately change an angle of the plurality of gratings if the angle of the plurality of gratings is unsuitable and such unsuitable angle makes the first phase contrast image 20 unclear.

In this embodiment, as discussed above, the three types of first phase contrast images include the dark-field image 23, and the controller 6 is configured to display the angle information on the plurality of gratings rotated by the grating rotation mechanisms on the display 10. Accordingly, users can easily know the angle information on the plurality of gratings in the dark-field image 23. As a result, users can more appropriately change an angle of the plurality of gratings if the angle of the plurality of gratings is unsuitable and such unsuitable angle makes an orientation of the fibers or a crack included in the subject 90 unclear in the dark-field image 23.

In this embodiment, as discussed above, irradiation time as the imaging condition for the preview images is shorter than the imaging condition for the actual imaging, or the number of imaging shots as the imaging condition for the preview images is smaller than the imaging condition for the actual imaging. Accordingly, users can see the first phase contrast images 20, which are the absorption, differential phase and dark-field images 21, 22 and 23, as preview images within a shorter time than actual imaging prior to the actual imaging. Consequently, the first phase contrast images 20 as the preview images can be displayed in the second area 12 within a shorter time than a case in which the preview images are captured under the same imaging condition as the actual imaging.

In this embodiment, as discussed above, the image processor 5 is configured to generate as the second phase contrast image 24 a phase contrast image that corresponds to a type selected by a user from the types of the first phase contrast images 20, which can be seen by the user, and is captured under the imaging conditions for the actual imaging. Accordingly, if a user find an unnecessary second phase contrast image 24 in the three types of second phase contrast images 24, a time required to acquire the other necessary types of second phase contrast images 24 can be reduced as compared with a case all of the three types of second phase contrast images 24 are automatically generated.

In this embodiment, as discussed above, the controller 6 is configured to display one first phase contrast image 20 selected from the first phase contrast images 20, which have been displayed in a thumbnail size, larger than the thumbnail size. Accordingly, users can easily see the details of the first phase contrast image 20 selected.

Modified Embodiments

Note that the embodiment disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

Generation of Dark-Field Images

While the example in which the second phase contrast image 24 of a dark-field image 27 is generated has been shown in the aforementioned embodiment, the present invention is not limited to this. In the present invention, the image processor 5 may be configured to generate a plurality of dark-field images 27 that are captured when the gratings are rotated to different angles by the grating rotation mechanisms in a plane orthogonal to an optical axis direction in a case in which the second phase contrast image 24 corresponding to the dark-field images 27 is generated in actual imaging. The different angles include a grating angle specified through the display 10, and a grating angle(s) corresponding to a predetermined angle(s) to which the first and second gratings 2 and 3 are rotated by the grating rotation mechanisms. The predetermined angle is approximately 90 degrees, for example. Note that the angle number of the predetermined angles and the angle number of the different angles are not specifically limited.

Here, when a dark-field image 27 is captured, if an internal structure of the subject 90 exhibits directivity in its X-ray scattering, an image of the internal structure may not be clearly formed in some relations between an orientation of each grating and an orientation of the subject 90 (scattering direction). Specifically, considering various scattering directions of X-rays scattered by the internal structure of the subject 90, X-rays that are scattered in a direction orthogonal to the orientation of the gratings among the various scattering directions will be imaged stronger. Contrary to this, X-rays that are scattered in a direction along the orientation of the gratings will be hardly imaged (insensitive), and as a result it may be difficult to form an image of the details of the internal structure depending on orientations of the subject 90 relative to the gratings. To address this, in this modified embodiment, in a case in which a second phase contrast image 24 of dark-field images 27 is generated, a plurality of dark-field images 27 are captured when the gratings are rotated to different angles by the grating rotation mechanisms in a plane orthogonal to an optical axis direction to generate the second phase contrast image 24 of dark-field images 27.

The controller 6 is configured to orientate the first and second gratings 2 and 3 in the lateral orientation (X-direction) by using the grating rotation mechanisms 7. The controller 6 is configured to capture images of the subject 90 while translating the first grating 2 by using the grating-moving mechanism 8. The image processor 5 is configured to generate the dark-field images 27 of the subject 90.

Figure 10:
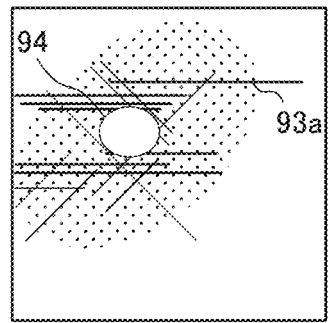
FIG. 10 is a schematic diagram showing dark-field images captured with gratings according to a modified embodiment being orientated at different angles.
Figure 10:
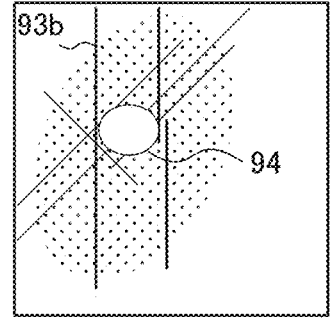

FIG. 10(A) shows a dark-field image 27 that is captured when the gratings are orientated in the lateral orientation (X-direction). In the exemplary image shown in FIG. 10(A), because the gratings are orientated in the lateral orientation (X-direction), among scratches 93 included in the subject 90, scratches 93a that extend in the lateral direction (X-direction) will be clearly shown. Here, a circular area 94 displays a blow mark that has been produced when the subject 90 is struck a blow.

Subsequently, the controller 6 will rotate the first and second gratings 2 and 3 by a predetermined angle by using the grating rotation mechanisms 7 so that the first and second gratings 2 and 3 are orientated in the vertical orientation (Y-direction). The controller 6 is configured to capture images of the subject 90 while translating the first grating 2 by using the grating-moving mechanism 8. The image processor 5 is configured to generate the dark-field images 27 of the subject 90.

FIG. 10(B) shows a dark-field image 27 that is captured when the gratings are orientated in the vertical orientation (Y-direction). In the exemplary image shown in FIG. 10(B), because the gratings are orientated in the vertical orientation (Y-direction), among the scratches 93 included in the subject 90, scratches 93b that extend in the vertical direction (Y-direction) will be clearly shown. Here, a circular area 94 displays the blow mark, which has been produced when the subject 90 is struck a blow.

Also, the image processor 5 may be configured to combine the plurality of dark-field images 27, which are captured when the gratings are orientated by the grating rotation mechanisms 7 at different angles in the plane orthogonal to the optical axis direction, and to produce a total scattering image representing scattering intensities of X-rays that are scattered by the subject 90.

In the above modified embodiment, the image processor 5 is configured to generate dark-field images 27 that are captured when the gratings are rotated to different angles by the grating rotation mechanisms 7 in a plane orthogonal to an optical axis direction in a case in which at least a second phase contrast image 24 corresponding to a dark-field image 27 is generated. Accordingly, even if the internal structure of the subject 90 exhibits directivity in its X-ray scattering, a suitable image of the internal structure of the subject 90 can be formed.

While the example in which the image processor 5 is configured to generate the three types of first phase contrast images 20, which are the absorption image 21, the differential phase image 22 and the dark-field image 23, as the preview images, and the controller 6 is configured to display the three types of first phase contrast images 20, which are the absorption image 21, the differential phase image 22 and the dark-field image 23, on the display 10 has been shown in the aforementioned embodiment, the present invention is not limited to this. In the present invention, the image processor 5 may be configured to generate two or more types of first phase contrast images 20 selected from the absorption image 21, the differential phase image 22 and the dark-field image 23 as the preview images, and the controller 6 may be configured to display the two or more types of first phase contrast images 20 selected from the absorption image 21, the differential phase image 22 and the dark-field image 23 and generated by the image processor 5 in a thumbnail size.

While the example in which the real-time display image 28 and the three types of first phase contrast images 20 are displayed in a common screen of the display 10 has been shown in the aforementioned embodiment, the present invention is not limited to this. In the present invention, the real-time display image 28 and the three types of first phase contrast images 20 may be displayed on different displays 10.

While the example in which the three types of first phase contrast images 20 are displayed in a thumbnail size in the second area 12 has been shown in the aforementioned embodiment, the present invention is not limited to this. In the present invention, the three types of first phase contrast images 20 may be displayed not in a thumbnail size in the second area 12 but in a size larger than the thumbnail size on the display 10.

While the example in which the controller 6 is configured to display as a pop-up image one first phase contrast image 20 that is selected from the first phase contrast images 20, which have been displayed in a thumbnail size, in a size larger than the thumbnail size has been shown in the aforementioned embodiment, the present invention is not limited to this. In the present invention, the controller 6 may be configured to display one first phase contrast image 20 that is selected from the first phase contrast images 20, which have been displayed in a thumbnail size, in the first area 11 instead of the real-time display image 28.

While the example in which the imaging conditions for preview image includes a condition that irradiation time is shorter than the imaging conditions for the actual imaging, a condition that the number of imaging shots is smaller than the imaging condition for the actual imaging, and a condition that a reference image that has been captured is reused in another shot has been shown in the aforementioned embodiment, the present invention is not limited to this. In the present invention, the imaging conditions for preview image may include any one or two of the aforementioned conditions.

Also, while the example in which the grating-moving mechanism 8 is configured to translate the first grating 2 has been shown in the aforementioned embodiment, the present invention is not limited to this. Any of the gratings may be translated.

Also, while the example in which the plurality of gratings includes the first and second gratings 2 and 3 has been shown in the aforementioned embodiment, the present invention is not limited to this. In the present invention, the plurality of gratings may further include a third grating arranged between the X-ray source 1 and the first grating 2. In this case, the third grating can increase coherence of X-rays radiated from the X-ray source 1.

Modes

The aforementioned exemplary embodiment will be understood as concrete examples of the following modes by those skilled in the art.

(Mode Item 1)

An X-ray phase imaging apparatus includes an X-ray source configured to irradiate a subject with X-rays; a detector configured to detect X-rays radiated from the X-ray source; a plurality of gratings arranged between the X-ray source and the detector; an image processor configured to generate two or more types of first phase contrast images selected from absorption, differential phase and dark-field images as preview images based on image signals of the subject produced by the X-ray source and the detector under an imaging condition simpler than an imaging condition for a second phase contrast image to be captured in actual imaging; and a controller configured to display the first phase contrast images generated by the image processor on a display.

(Mode Item 2)

The X-ray phase imaging apparatus according to the mode item 1, wherein the controller is configured to display a real-time display image of the subject irradiated with X-rays from the X-ray source in real time and the two or more types of first phase contrast images in a common screen of the display.

(Mode Item 3)

The X-ray phase imaging apparatus according to the mode item 2, wherein the controller is configured to display the two or more types of first phase contrast images in a thumbnail size in an area in proximity to a display area for the real-time display image.

(Mode Item 4)

The X-ray phase imaging apparatus according to the mode item 1 further includes a grating rotation mechanism configured to rotate the plurality of gratings in a plane orthogonal to an optical axis direction of the X-rays, wherein the controller is configured to further display angle information on the plurality of gratings on the display.

(Mode Item 5)

The X-ray phase imaging apparatus according to the mode item 4, wherein the two or more types of first phase contrast images include the dark-field image, and the controller is configured to display the angle information on the plurality of gratings rotated by the grating rotation mechanism on the display.

(Mode Item 6)

The X-ray phase imaging apparatus according to the mode item 1, wherein irradiation time as the imaging condition for the preview images is shorter than the imaging conditions for the actual imaging, or the number of imaging shots as the imaging condition for the preview images is smaller than the actual imaging.

(Mode Item 7)

The X-ray phase imaging apparatus according to the mode item 1, wherein the image processor is configured to generate as the second phase contrast image a phase contrast image that corresponds to a type selected by a user from the types of the first phase contrast images, which can be seen by the user, and is captured under the imaging condition for the actual imaging.

(Mode Item 8)

The X-ray phase imaging apparatus according to the mode item 3, wherein the controller is configured to display one first phase contrast image selected from the first phase contrast images, which have been displayed in a thumbnail size, larger than the thumbnail size.

(Mode Item 9)

A display method of a preview image in an X-ray phase imaging apparatus includes a step of generating two or more types of first phase contrast images selected from absorption, differential phase and dark-field images as preview images based on image signals of a subject produced by an X-ray source and a detector under an imaging condition simpler than an imaging condition for a second phase contrast image to be captured in actual imaging; and a step of displaying the generated first phase contrast images on a display.

The invention claimed is:

1. An X-ray phase imaging apparatus comprising:
an X-ray source configured to irradiate a subject with X-rays;
a detector configured to detect X-rays radiated from the X-ray source;
a plurality of gratings arranged between the X-ray source and the detector;
an image processor configured to generate two or more types of first phase contrast images selected from absorption, differential phase and dark-field images as preview images based on image signals of the subject produced by the X-ray source and the detector under an imaging condition simpler than an imaging condition for a second phase contrast image to be captured in actual imaging; wherein the image processor is configured to generate as the second phase contrast image a phase contrast image that corresponds to a type selected by a user from the types of the first phase contrast images, which can be seen by the user, and is captured under the imaging condition for the actual imaging; and
a controller configured to display the first phase contrast images generated by the image processor on a display.

2. The X-ray phase imaging apparatus according to claim 1, wherein the controller is configured to display a real-time display image of the subject irradiated with X-rays from the X-ray source in real time and the two or more types of first phase contrast images in a common screen of the display.

3. The X-ray phase imaging apparatus according to claim 2, wherein the controller is configured to display the two or more types of first phase contrast images in a thumbnail size in an area in proximity to a display area for the real-time display image.

4. The X-ray phase imaging apparatus according to claim 3, wherein the controller is configured to display one first phase contrast image selected from the first phase contrast images, which have been displayed in a thumbnail size, larger than the thumbnail size.

5. The X-ray phase imaging apparatus according to claim 1 further comprising a grating rotation mechanism configured to rotate the plurality of gratings in a plane orthogonal to an optical axis direction of the X-rays, wherein
the controller is configured to further display angle information on the plurality of gratings on the display.

6. The X-ray phase imaging apparatus according to claim 5, wherein
the two or more types of first phase contrast images include the dark-field image, and
the controller is configured to display the angle information on the plurality of gratings rotated by the grating rotation mechanism on the display.

7. The X-ray phase imaging apparatus according to claim 1, wherein irradiation time as the imaging condition for the preview images is shorter than the imaging condition for the actual imaging, or the number of imaging shots as the imaging condition for the preview images is smaller than the imaging condition for the actual imaging.

8. A display method of a preview image in an X-ray phase imaging apparatus comprising:
a step of generating two or more types of first phase contrast images selected from absorption, differential phase and dark-field images as preview images based on image signals of a subject produced by an X-ray source and a detector under an imaging condition simpler than an imaging condition for a second phase contrast image to be captured in actual imaging;
a step of displaying the generated first phase contrast images on a display; and
generating as the second phase contrast image a phase contrast image that corresponds to a type selected by a user from the types of the first phase contrast images, which can be seen by the user, and is captured under the imaging condition for the actual imaging.

* * * * *